(12) United States Patent
Savage et al.

(10) Patent No.: US 8,739,299 B1
(45) Date of Patent: May 27, 2014

(54) CONTENT UNLOCKING

(75) Inventors: Paul Savage, Scranton, PA (US); Dave Lydon, Clarks Summit, PA (US); Robert A. Davis, Taylor, PA (US)

(73) Assignee: Cinram Group, Inc., Phoenix, AZ (US)

( * ) Notice: Subject to any disclaimer, the term of this patent is extended or adjusted under 35 U.S.C. 154(b) by 417 days.

(21) Appl. No.: 12/978,299

(22) Filed: Dec. 23, 2010

Related U.S. Application Data

(60) Provisional application No. 61/290,052, filed on Dec. 24, 2009.

(51) Int. Cl.
*H04L 29/06* (2006.01)

(52) U.S. Cl.
USPC ................................ 726/27; 713/161; 380/201

(58) Field of Classification Search
None
See application file for complete search history.

(56) References Cited

U.S. PATENT DOCUMENTS

| | | |
|---|---|---|
| 4,995,799 A | 2/1991 | Hayashi et al. |
| 5,181,081 A | 1/1993 | Suhan |
| 5,247,494 A | 9/1993 | Ohno et al. |
| 5,303,224 A | 4/1994 | Chikuma et al. |
| 5,315,107 A | 5/1994 | Smith et al. |
| 5,457,746 A | 10/1995 | Dolphin |
| 5,540,966 A | 7/1996 | Hintz |
| 5,766,359 A | 6/1998 | Sichmann et al. |
| 5,766,495 A | 6/1998 | Parette |
| 5,792,538 A | 8/1998 | Yurescko-Suhan |
| 5,800,687 A | 9/1998 | Kempf |
| 5,815,333 A | 9/1998 | Yamamoto et al. |
| 5,863,328 A | 1/1999 | Sichmann et al. |
| 5,863,399 A | 1/1999 | Sichmann |
| 5,900,098 A | 5/1999 | Mueller et al. |
| 5,905,798 A | 5/1999 | Nerlikar et al. |
| 5,913,653 A | 6/1999 | Kempf |
| 5,923,640 A | 7/1999 | Takemura et al. |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,949,752 A | 9/1999 | Glynn et al. |
| 5,958,651 A | 9/1999 | Van Hoof et al. |
| 5,991,798 A | 11/1999 | Ozaki et al. |
| 5,995,481 A | 11/1999 | Mecca |
| 5,997,976 A | 12/1999 | Mueller et al. |
| 6,031,808 A | 2/2000 | Ueno |
| 6,035,329 A | 3/2000 | Mages et al. |
| 6,047,292 A | 4/2000 | Kelly et al. |
| 6,117,284 A | 9/2000 | Mueller |
| 6,124,011 A | 9/2000 | Kern |
| 6,160,787 A | 12/2000 | Marquardt, Jr. et al. |
| 6,195,693 B1 | 2/2001 | Berry et al. |
| 6,212,158 B1 | 4/2001 | Ha et al. |

(Continued)

OTHER PUBLICATIONS

U.S. Appl. No. 11/715,249, filed Mar. 6, 2007 of William R. Mueller et al.

(Continued)

*Primary Examiner* — Izunna Okeke
(74) *Attorney, Agent, or Firm* — Cooper & Dunham LLP

(57) ABSTRACT

A content protection scheme for controlling access to digital content comprises dividing content into data sectors, storing the data sectors on a storage medium and storing selected original data sectors at a remote location. Additional content is unlocked by the remote location only if data from a storage medium correlates to at least a portion of data of the corresponding selected original data sectors.

18 Claims, 7 Drawing Sheets

(56) References Cited

U.S. PATENT DOCUMENTS

| | | | |
|---|---|---|---|
| 6,261,403 B1 | 7/2001 | Gerigk et al. | |
| 6,309,496 B1 | 10/2001 | Van Hoof | |
| 6,309,727 B1 | 10/2001 | Mueller et al. | |
| 6,317,407 B1 | 11/2001 | Takemura et al. | |
| 6,317,779 B1 | 11/2001 | Gile et al. | |
| 6,341,375 B1 | 1/2002 | Watkins | |
| 6,343,060 B1 | 1/2002 | Ko | |
| 6,353,890 B1 * | 3/2002 | Newman | 713/193 |
| 6,361,845 B1 | 3/2002 | Kern | |
| 6,368,435 B1 | 4/2002 | Kempf | |
| 6,396,798 B1 | 5/2002 | Takemura et al. | |
| 6,418,111 B1 | 7/2002 | Takemura et al. | |
| 6,438,232 B1 | 8/2002 | Mages et al. | |
| 6,440,248 B1 | 8/2002 | Mueller | |
| 6,480,462 B2 | 11/2002 | Ha et al. | |
| 6,500,297 B1 | 12/2002 | Paulus et al. | |
| 6,527,538 B1 | 3/2003 | Pickutoski et al. | |
| 6,564,255 B1 | 5/2003 | Mobini et al. | |
| 6,580,683 B1 | 6/2003 | Braitberg et al. | |
| 6,587,424 B2 | 7/2003 | Kuroda et al. | |
| 6,628,603 B1 | 9/2003 | Kam et al. | |
| 6,678,237 B1 | 1/2004 | Edwards et al. | |
| 6,725,258 B1 | 4/2004 | Bick et al. | |
| 6,726,973 B2 | 4/2004 | Mueller | |
| 6,814,825 B2 | 11/2004 | Becker et al. | |
| 6,896,829 B2 | 5/2005 | Kern et al. | |
| 7,325,287 B2 | 2/2008 | Sweeney | |
| 7,419,045 B2 | 9/2008 | Kelsch | |
| 7,535,806 B2 | 5/2009 | Fumanti | |
| 7,637,713 B1 | 12/2009 | Parette | |
| 7,701,825 B2 * | 4/2010 | Selve | 369/53.21 |
| 2001/0042111 A1 | 11/2001 | Douzono | |
| 2002/0071382 A1 | 6/2002 | Netsu et al. | |
| 2003/0152019 A1 | 8/2003 | Thompson et al. | |
| 2003/0229679 A1 | 12/2003 | Yoo et al. | |
| 2004/0002018 A1 | 1/2004 | Oishi et al. | |
| 2004/0008612 A1 | 1/2004 | Tsujita et al. | |
| 2004/0044900 A1 | 3/2004 | Wang et al. | |
| 2004/0052203 A1 | 3/2004 | Brollier | |
| 2004/0134603 A1 | 7/2004 | Kobayashi et al. | |
| 2004/0184390 A1 | 9/2004 | Oishi | |
| 2004/0202097 A1 | 10/2004 | Oyake et al. | |
| 2004/0257929 A1 | 12/2004 | Suzuki | |
| 2004/0264361 A1 | 12/2004 | Kondo | |
| 2005/0007944 A1 | 1/2005 | Uchiyama et al. | |
| 2005/0024993 A1 | 2/2005 | Kurita et al. | |
| 2005/0031778 A1 | 2/2005 | Inoue | |
| 2005/0036423 A1 | 2/2005 | Ichimura et al. | |
| 2005/0039675 A1 | 2/2005 | Kang et al. | |
| 2005/0042371 A1 | 2/2005 | Ushida et al. | |
| 2005/0048250 A1 | 3/2005 | Yamaga et al. | |
| 2005/0050343 A1 * | 3/2005 | Selinfreund et al. | 713/193 |
| 2005/0052985 A1 | 3/2005 | Senshu et al. | |
| 2005/0053728 A1 | 3/2005 | Komaki | |
| 2005/0053752 A1 | 3/2005 | Komaki | |
| 2005/0072336 A1 | 4/2005 | Itoh et al. | |
| 2005/0072518 A1 | 4/2005 | Komaki et al. | |
| 2005/0109454 A1 | 5/2005 | Katoh et al. | |
| 2005/0112319 A1 | 5/2005 | Itoh et al. | |
| 2005/0132395 A1 | 6/2005 | Hisada et al. | |
| 2005/0147809 A1 | 7/2005 | Hongo et al. | |
| 2005/0158504 A1 | 7/2005 | Itoh et al. | |
| 2005/0175771 A1 | 8/2005 | Hisada | |
| 2005/0219991 A1 | 10/2005 | Van Den Oetelaar et al. | |
| 2006/0023598 A1 | 2/2006 | Babinski et al. | |
| 2006/0062131 A1 | 3/2006 | Nagata et al. | |
| 2006/0072428 A1 | 4/2006 | Marshall et al. | |
| 2006/0101634 A1 | 5/2006 | Sweeney | |
| 2006/0104190 A1 | 5/2006 | Babinski | |
| 2006/0165419 A1 | 7/2006 | Musto | |
| 2006/0181706 A1 | 8/2006 | Sweeney | |
| 2006/0222808 A1 | 10/2006 | Pickutoski et al. | |
| 2006/0270080 A1 | 11/2006 | Rinaldi | |
| 2006/0274617 A1 | 12/2006 | Musto et al. | |
| 2007/0008861 A1 | 1/2007 | Fumanti | |
| 2007/0014224 A1 | 1/2007 | Sweeney | |
| 2007/0029167 A1 | 2/2007 | Kelsch | |
| 2007/0090006 A1 | 4/2007 | Kelsch | |

OTHER PUBLICATIONS

U.S. Appl. No. 11/726,968, filed Mar. 22, 2007 of Lewis Gensel et al.
U.S. Appl. No. 11/936,625, filed Nov. 7, 2007 of Petrus Hubertus Van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.
U.S. Appl. No. 12/896,344, filed Oct. 1, 2010 of William R. Mueller et al.
U.S. Appl. No. 12/965,270 filed Dec. 10, 2010 of William R. Mueller et al.

* cited by examiner

CONTENT UNLOCKING

This disclosure is based on U.S. Provisional Application No. 61/290,052, entitled "CONTENT UNLOCKING" and filed Dec. 24, 2009, the entire contents of which are incorporated herein by reference.

TECHNICAL FIELD

This disclosure relates to an approach for controlling access to digital content, and more specifically controlling access to digital content based on a comparison of data recorded on a storage medium with an original copy of corresponding data stored at a remote location.

DESCRIPTION OF RELATED ART

Use of digital media for storing and transporting content has proliferated in recent years. For example, optical storage media ("optical media"), such as CDs (compact discs), DVDs (digital versatile discs or digital video discs) and BDs (Blu-ray discs), have popularly been used for storing and transporting digital content. For example, multimedia content and/or other data can be stored on optical media in an optically readable manner.

Several formats of optical media are currently available, including the following: (i) read-only formats such as CD-DA (digital audio compact disc), CD-ROM (CD-read-only memory), DVD-ROM, etc.; (ii) write-once read-many times formats such as CD-R (CD-recordable), and DVD-R (DVD-recordable), etc.; (iii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs; and (iv) hybrid optical media which include a combination of formats, such as CD-PROM (CD programmable ROM) which combines read-only CD-ROM format with recordable CD-R format.

In conventional read-only type optical media (e.g, CD-ROM, DVD-ROM), data is generally stored as a series of "pits" embossed with a plane of "lands". Microscopic pits formed in the surface of the plastic medium are arranged in tracks, conventionally spaced radially from the center hub in a spiral track originating at the medium center hub and ending toward the medium's outer rim. The intensity of the light reflected from a read-only medium's surface by an optical medium player or reader varies according to the presence or absence of pits along the information track. When the readout spot is over the flat part of the track, more light is reflected directly from the disc than when the readout spot is over a pit. A photodetector and other electronics inside the optical medium player translate the signal from the transition points between these pits and lands caused by this variation into the zeroes and ones of the digital code representing the stored information.

Optical media can be used to store and distribute large volumes of content. For example, a CD-ROM typically has a capacity in excess of 600 MB. Conventional DVD read-only discs have a capacity of from 4.7 GB to 17.0 GB. Conventional CD-ROMs have a minimum pit length of 0.834 µm, a pit width of 0.6 µm and a track pitch of 1.6 µm. Conventional DVD-ROMs, in comparison, typically have a minimum pit length in a range of 0.4 to 0.44 µm, a pit width of 0.32 µm and a track pitch of 0.74 µm. The reduced pit and track dimensions of DVDs (relative to CDs) allow them to have higher density than CDs.

For example, conventional write-once DVDs have a capacity of 3.95 GB to 7.90 GB, and conventional rewriteable DVDs have a capacity of from 2.6 GB to 10.4 GB. In contrast, a conventional magnetic floppy diskette is only capable of storing 1.44 Mb of data. The high storage density of optical media has allowed optical media generally to replace magnetic media, for storing multimedia content and/or data.

Optical media using a blue laser (with a wavelength range of 400 nm to 420 nm) have also been introduced, such as BD, mentioned supra, which includes read-only, recordable and rewritable formats, as well as multi-information-layer and dual-sided formats. BD provides high density formats directed to demands for greater information density and capacity of optical storage media.

Hybrid optical media have also been introduced which combine information layers of different formats in a single optical medium. Depending on a type of the hybrid media, the different information layers may be read from the same side of the media or from different sides of the media.

Some exemplary optical storage disc manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973, 6,896,829, 4,995,799, 5,766,359, 5,800,687, 5,863,328, 5,863,399, 5,913,653, 6,261,403, 6,368,435 and 6,814,825, which are incorporated by reference herein in their entireties in order to more fully describe the state of the art as of the date of the subject matter described and claimed herein.

Unfortunately, the high capacity of optical media, coupled with recent enhancements to personal computers and publically available software for unauthorized replication of copyrighted content stored on the optical media (onto other storage media), renders content stored on the optical media an easy target for illicit use. For example, unauthorized copying of proprietary and/or copyrighted, recorded content from optical media to optical or other storage media on a large scale (also referred to as "piracy") is a growing concern. The piracy typically entails using software on a computer system having an optical medium drive to copy content from a pre-recorded optical medium onto recordable optical media such as CD-R or CD-RW (or DVD-R, DVD-RW or DVD+RW) discs, onto hard drives or solid state drives more permanently installed in a computer, or even onto portable hard drives or USB (Universal Serial Bus) storage devices.

Software used for piracy of recorded content can perform a one-to-one data copy process on a computer system in order to ensure that all of the data is copied from a pre-recorded medium onto another medium. Generally, the data copy process includes reading the data on the recorded optical medium with an optical medium drive of the computer system, storing the data on a hard disk of the computer system, and then recording the data onto recordable optical media (as many recordings as desired).

Several copy protection techniques and devices have been proposed to limit copying of content stored on optical media.

One proposed copy protection method (known as Analog CPS or Macrovision) requires the installation of circuitry in every optical media player used to read optical media. When an optical medium is "Macrovision Protected," the electronic circuit reproducing data from the medium sends a colorburst signal to the composite video and s-video outputs of the player, resulting in imperfect copies when the copies are made based on a video signal supplied through the composite video and s-video outputs. The use of Macrovision also adversely affects, however, normal playback quality.

In another proposed technique, an instruction is stored at one region of an optical disc for skipping over a certain area of the disc during playback. When performing a one-to-one data copy process, the instruction to skip is not processed and the certain area to be skipped is instead read. The certain area to be skipped is configured to contain an instruction or other feature which causes the data copying process to terminate. However, such technique is easily defeated by instructing the player to read the instruction to skip before initiating the data copy process.

According to another technique, the optical medium contains recorded content and, in addition, information which dictates whether the recorded content can be copied. For example, according to the Copy Generation Management System (CGMS), each disk carries a code that authorizes or forbids copying of the recorded content. A disk with a code authorizing copying can be copied, but the copying device changes the code so that further copies are not possible. However, the CGMS technique suffers the disadvantages that large numbers of copies of content on a disk can be made, when the disk bears the code authorizing a single copy, by reading the recorded content with an optical medium drive, storing the data on a hard disk, and then recording the data on as many media as desired. Further, the copy prevention mechanism can be circumvented even when the access code indicates that no copies are permitted, if the entire data content of the disk bearing the code authorizing copying is copied. Therefore, in order for copy restriction information to be effective, the device that is used to copy the media must be equipped to recognize the copy restriction information and also must respect the information to reject unauthorized copying.

In another proposed technique, data stored on the optical medium is encrypted using a particular algorithm (for example, CSS (Content Scramble System) in the case of DVD) that is designed to prevent direct, digital-to-digital copying. The CSS algorithm compresses the data files on a sector-by-sector basis and then scrambles them. Each CSS-compliant player which is authorized to reproduce the encrypted data is provided with one of a large number of keys that allow the player to decode/descramble the data on the media, but is prevented from distributing copies of the keys needed to decrypt the data. However, complementary decryption tools generally can readily be developed by those with knowledge of the encryption algorithm. The CSS encryption algorithm has been broken and has been disseminated over the Internet.

Another technique includes writing a copy protection code at a pre-determined location on the disk during its fabrication. Media players are made to reject disks that do not have the protection code in the right location. However, a device designed or adapted to read all data at all locations on the disk can copy the disk including its protection code, and the illegal copy thus-obtained is then strictly identical to the original.

Some proposed techniques use a specific "signature" on the disk consisting of a variation of certain recording parameters, such as the form of the marks (depth, width, length), introduction of an asymmetry in the marks, wobbulation of the track at special frequencies, and so on. These variations constitute the signature that must be sought by the media player, and they cannot be reproduced by ordinary CD writers such as CD-R recorders. However, standard media players generally are not adapted to detect these variations.

Content owners (such as movie studios, music labels, etc.) may have other concerns regarding content access. For example, digital content owners or sellers may desire for the content not to be released to the public before a certain date. As an example, a movie studio may require that DVDs or BDs pre-recorded with digital content in the form of a movie or video not be released to the public until a particular release date. However, restricting sales of storage media pre-recorded with digital content before a release date poses many problems, such as unauthorized pre-release sales, pre-release theft of storage media and other problems associated with piracy, such as discussed supra.

In an attempt to address these concerns, there has been proposed a system (AACS, or Advanced Access Control System) for permitting playback of storage media after a decryption key is downloaded from a server under the control of the content provider. However, this system shares many of the same problems mentioned supra, such as piracy, theft, independent determination (based on publicly available information and/or illicitly obtained information, such as through reverse engineering) of a decryption key needed for playback of the content, etc.

In another proposed system, a consumer is sold digital content stored on a storage medium through a brick-and-mortar retail source or over the internet, and the content is accompanied by information indicating a remote location from which additional information (which was not included in the initially purchased digital content) can be obtained. However, this system requires a consumer to download a large amount of data.

There remains a need for improved techniques for unlocking content on storage media as well as content at remote locations which balances weights afforded to concerns of content owners regarding content security and preference of users for convenience.

SUMMARY

This disclosure provides tools for controlling access to digital content. In an aspect, content is unlocked if data from a storage medium matches corresponding original data. Original content data may be divided and stored on a storage medium as one or more data sectors. The data sectors may be encrypted or compressed. Original data sector information is sent to a remote location. A player playing a storage medium is configured to obtain connection information for connecting to the remote location from the storage medium and establish a connection with the remote location over an information network.

The remote location instructs the player to read data from at least one data sector corresponding to at least one of the original data sectors stored at the remote location. The remote location compares the original data sectors to the data received from the player. If the data from the player correlates to at least a portion of the original sector data, additional digital content is unlocked by the remote location.

The unlocked digital content may also be stored at the remote location and output to the player by the remote location upon unlocking. In another example, the unlocked content may be located in some other location and unlocking information is sent by the remote location to a user for obtaining the unlocked content from the other location.

An exemplary authoring apparatus according to the present disclosure performs a method of receiving original content and dividing the content into at least one data sector. The at least one data sector is added to a disc image along with content identification information and remote location information.

An exemplary content unlocking apparatus according to the present disclosure may be a server including a local storage part, a network communication part and a control part. The control part may be configured to unlock additional content only if data requested and received from a player via the network communication part matches at least a predetermined portion of corresponding original data sectors stored on the local storage part.

An exemplary content reproduction apparatus according to the present disclosure includes a media receiving part, a reader part, a network communication part, a control part, and an output part. The control part is configured to control the reader part to read a location of a remote location at which verification of the medium may be performed and to establish a connection with the remote location through the network communication part. The control part causes the reader part to read data from at least one data sector and output the data to the remote location through the network communication part. If successfully validated, the remote location unlocks the additional content which may be downloaded and output to a display along with any content stored on the storage medium via the output part.

BRIEF DESCRIPTION OF THE DRAWINGS

The aforementioned and other aspects, features and advantages can be more readily understood from the following detailed description with reference to the accompanying drawings wherein.

DETAILED DESCRIPTION

Figure 1A:
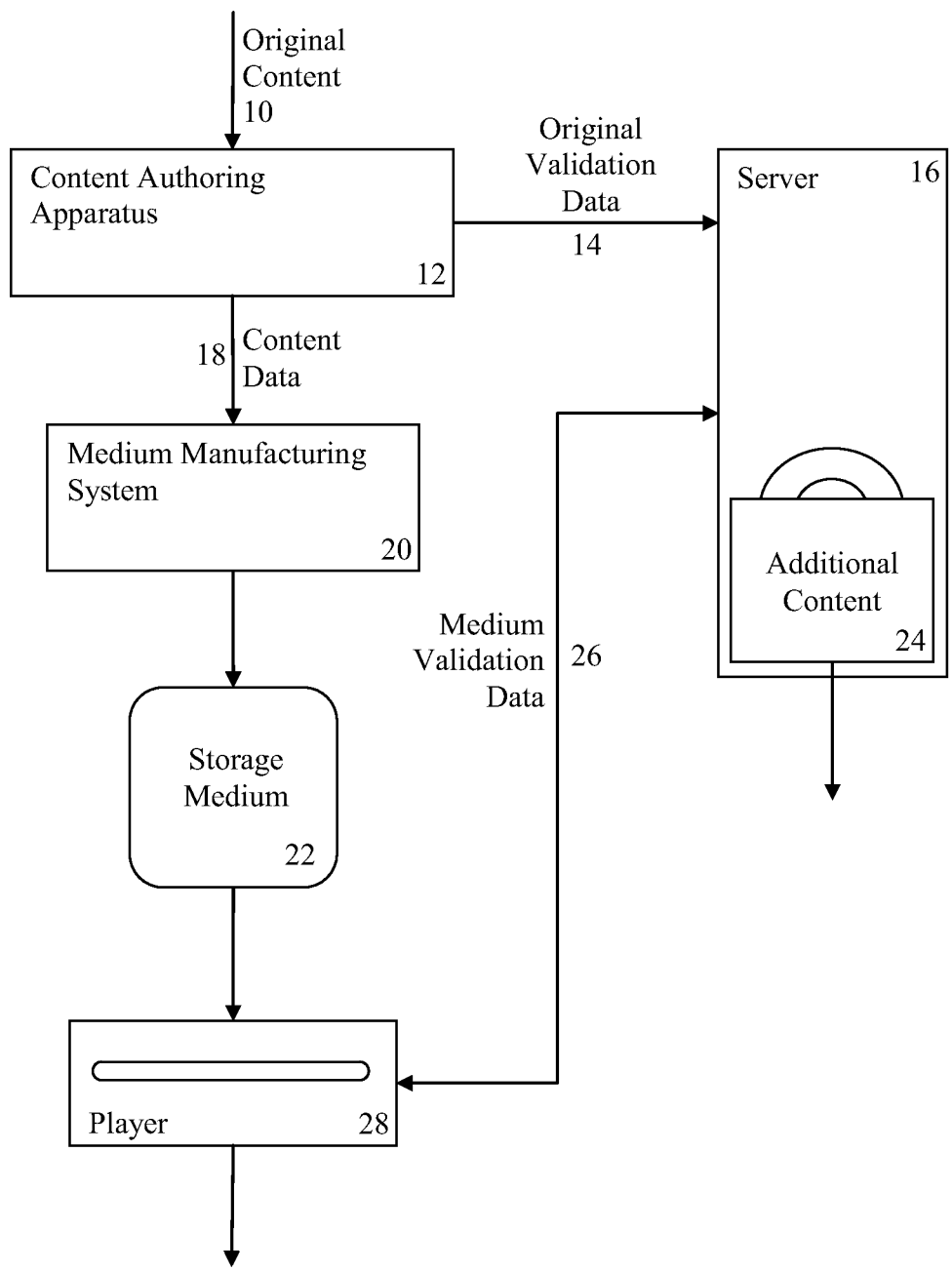
FIG. 1A graphically illustrates an example of a content protection and unlocking scheme according to an exemplary embodiment of the present disclosure.

Methodologies for protecting digital content stored on storage media or at remote locations from unauthorized unlocking are described herein, with reference to examples and exemplary embodiments, as described herein employing specific terminology. However, the disclosure is not intended to be limited to the specific terminology so selected and it is to be understood that each specific element includes all technical equivalents that operate in a similar manner.

The term "storage medium" or "storage media" as used in this application generally refers to any (one or more of) apparatus, device, composition, and the like, capable of retaining content for future use, copying, playback, and the like. Some examples of storage media include optical storage discs such as CDs, DVDs and BDs, hard drives or other solid state drives, USB memory sticks, SD (Secure Digital) memory cards, etc.

The terms "title", "content" and "digital content" are generally used in this disclosure to refer to any collection of information (for example, visual aural, textual, numerical, interactive, a program of instructions executable by a computer or other device having a processor, combinations thereof, etc.), represented by data storable and reproducible from a storage medium. Examples of such data include videos, audio files, text documents, spreadsheets, databases, etc.

The term "original content" is generally used in this disclosure to refer to a content or title before it is written to storage media.

The term "media player" as used in this application generally refers to an electronic appliance or software tangibly embodied on or in a computer-readable medium which can be executed on a computer capable of reproducing content from a storage medium. Such media player is also sometimes referenced herein as a "reader" or "player".

The terms "play" and "reproduce" are generally used in this disclosure to refer to operations in which content is reproduced from a storage medium storing data representing such content, and output to one or more output devices (such as a speaker, display, printing device, other electronic devices presenting content via visual, aural, or other humanly detectable and comprehensible stimuli, etc.).

The term "remote location" is generally used in this disclosure to refer to any device, apparatus, computer and the like separate from a media player. The remote location may be connectable to a media player by a connection such as a network (wired, wireless, or any combination thereof) or similar form of electronic communication means. Another example of a remote location may have no connection to a media player but may communicate with a storage medium directly, such as a storage medium authentication device located in a retail store.

The term "server" is generally used in this disclosure to refer to, for example, a special-purpose device (such as including one or more application specific integrated circuits or an appropriate arrangement of conventional component circuits) or software-configured on a conventional personal computer or computer workstation or the like with sufficient memory, processing and communication capabilities to operate as a server and/or web server, as will be appreciated to those skilled in the relevant arts.

The terms "network" and "information network" are generally used in this disclosure to refer to, for example, any means by which an electronic signal may be communicated from one location to another. Examples of information networks include the internet, LAN (Local Area Networks), WAN (Wide Area Networks), wireless networks (such as Bluetooth, WLAN, infrared, radio frequency, CDMA, GSM, WiMAX, PCS, etc.). Communication through a network between devices may be accomplished using protocols well understood to those skilled in the relevant arts.

In an example of a content unlocking method according to the present disclosure, shown generally in FIG. 1A, original content data 10 is input to a content authoring apparatus 12. The content authoring apparatus 12 outputs original validation data 14 to a server 16 and outputs content data 18 to a medium manufacturing system 20. The medium manufacturing system 20 manufactures a storage medium 22 having the content data 18 stored therein. The server 16, at which additional content 24 is stored, is configured to inspect the values of medium validation data 26 stored on the storage medium 22 and sent from a player 28 reading the storage medium 22 to determine whether or not the storage medium 22 is an original storage medium. The server 16 compares the medium validation data 26 to the original validation data 14 received from the content authoring apparatus 12 and determines if the two data sets correlate to each other. Upon a determination that the storage medium 22 is original, the additional content data 24 stored at the server 16 is unlocked and allowed to be retrieved by the player 28 or some other content reproduction apparatus.

In an aspect of the present disclosure, content may be stored on a storage medium as a series of ones and zeros, or data bits. A data byte may comprise a predetermined number of data bits. For example, each data byte may comprise a combination of eight ones and zeroes.

A group of data bytes representing content data, or content data frame, may be separated from other groups of data bytes representing content data. A separated data frame, along with additional data byte groups representing data other than the content data may comprise a sector of data. Such other data may be, for example, data identifying the associated content data frame. The other data may also indicate, for example, an encryption method, an encryption key, error correcting code, or other information associated with the data frame. The data sectors on a storage medium may be configured to each comprise a predetermined amount of data.

Figure 2A:
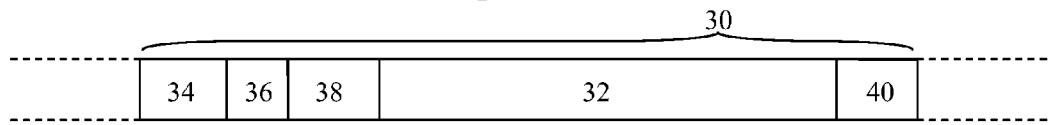
FIG. 2A graphically illustrates a composition of a data sector according to an exemplary embodiment of the present disclosure.

An example of a data sector 30 is graphically represented in FIG. 2A. As shown in FIG. 2A, a data sector 30 includes a content data portion 32. The content data portion 32 may be configured to comprise a predetermined number of content data bytes. The data sector 30 may additionally comprise other groups of data bytes. For example, a data sector 30 may additionally comprise one or more sector or content data identification data bytes 34, one or more reading error detection data bytes 36, or one or more information protection data bytes 38. The additional data bytes may be grouped together in a data sector 30 or may be separated. Also, the additional data bytes may be configured to precede or follow the content data portion 32. For example, a second group of reading error detection bytes 40 may be located following the content data portion 32.

Data sectors, including content data and associated other data may be arranged on a storage medium in a repeating pattern. For example, a storage medium may comprise a plurality of data sectors, each data sector comprising a group of content data as well as associated other data. The data sectors may be arranged one after another along a spiral track in an information layer of the medium.

The number and contextual significance of the plurality of data bytes in a data sector may be predetermined and consistent for all data sectors on a storage medium. The number and contextual significance of the data bytes within each data sector may also be common to a storage medium format. As one example, data sectors stored on storage media may each comprise 2048 content data bytes preceded by 12 bytes of sector identification, error correction information and copy protection information, and may be followed by another 4 bytes of error correction information.

The content data may be encrypted and/or compressed as it is stored on a storage media. Encryption may be applied using any available method, including AACS, CSS, etc. Compression may additionally or alternatively be applied using any available method or algorithm, such as, for example, any of the various MPEG versions. Compression techniques, when used in addition to encryption techniques on content data, may be performed either before or after encryption.

Encryption techniques generally transform data from an unencrypted state to an encrypted state by changing the values and/or relative positions of unencrypted data groupings (bits, bytes, or some other denomination of ones and zeros) according to an encryption algorithm. The encryption algorithm may use one or more keys to encrypt data. The one or more keys may be static or may be variable. The keys or other information indicating an encryption method or an associated decryption method are examples of information that may be stored within a data sector in addition to a content data frame.

Decryption techniques generally transform data from an encrypted state back to an unencrypted state. To decrypt data, a decryption algorithm is used. The decryption algorithm takes into account the encryption algorithm used to encrypt the data as well as any keys necessary for decryption. The decryption keys may be the same as or different from any encryption keys used to encrypt the data. As a result of decryption, data values or positions changed as a result of an encryption process are restored, or changed back, to their original values.

In an optical storage medium, the ones and zeroes comprising content data may be represented by the presence and spacing of transitions between pits and lands formed in an information layer of an optical storage medium. The presence of a transition may indicate a one while an area of pit or land not at a transition may indicate a zero.

In read-only optical storage media, an additional data area of the media, in addition to a main data area, may be configured for storing data which is not an area that is recordable on a recordable optical storage media of the same type. In other words, a read-only medium may include an additional data area not present or not changeable in a recordable optical storage medium. This additional data area may be configured anywhere on the media, including, for example, at an inner or outer ring shaped area of the media. The additional data area may, for example, be configured in a lead-in or lead-out area of an optical storage medium.

The additional data area may be configured to store data corresponding to, for example, encryption algorithm identification information, one or more encryption keys, content identification information, molding master identification information, etc.

All content data associated with a title may not be included on a storage medium. For example, some content data may be stored on a storage medium, while other content data may be stored separate from the medium, at a location accessible by a player. The other content data may be content data intended, for example, to be played in addition to or concurrently with the content data stored on the storage medium. As an example, scenes from a movie stored on a storage medium may be extracted and removed from the movie as stored on the storage medium and may be stored at a location separate from the storage medium. When a user instructs a player to play the movie, the player may locate and retrieve the extracted scenes and play them at their original position in a timeline of the movie.

As another example, a storage medium may include minimal or no content data besides information indicating a location from which content data may be retrieved by a player and reproduced.

In yet another example, a main portion of content data associated with a title may be stored on a storage medium, while associated, but not necessary, content data is stored at a separate location. For example, movie trailers, director's commentary, subtitles, etc. are examples of associated nonnecessary content data which may not be stored on the storage medium but instead stored at a separate location.

A separate or remote location according to the present disclosure may be any type of electronic device having a communication part configured to communicate with a player and also having a local storage part and a control part. An example of a remote location is a server, as discussed supra.

Figure 1B:
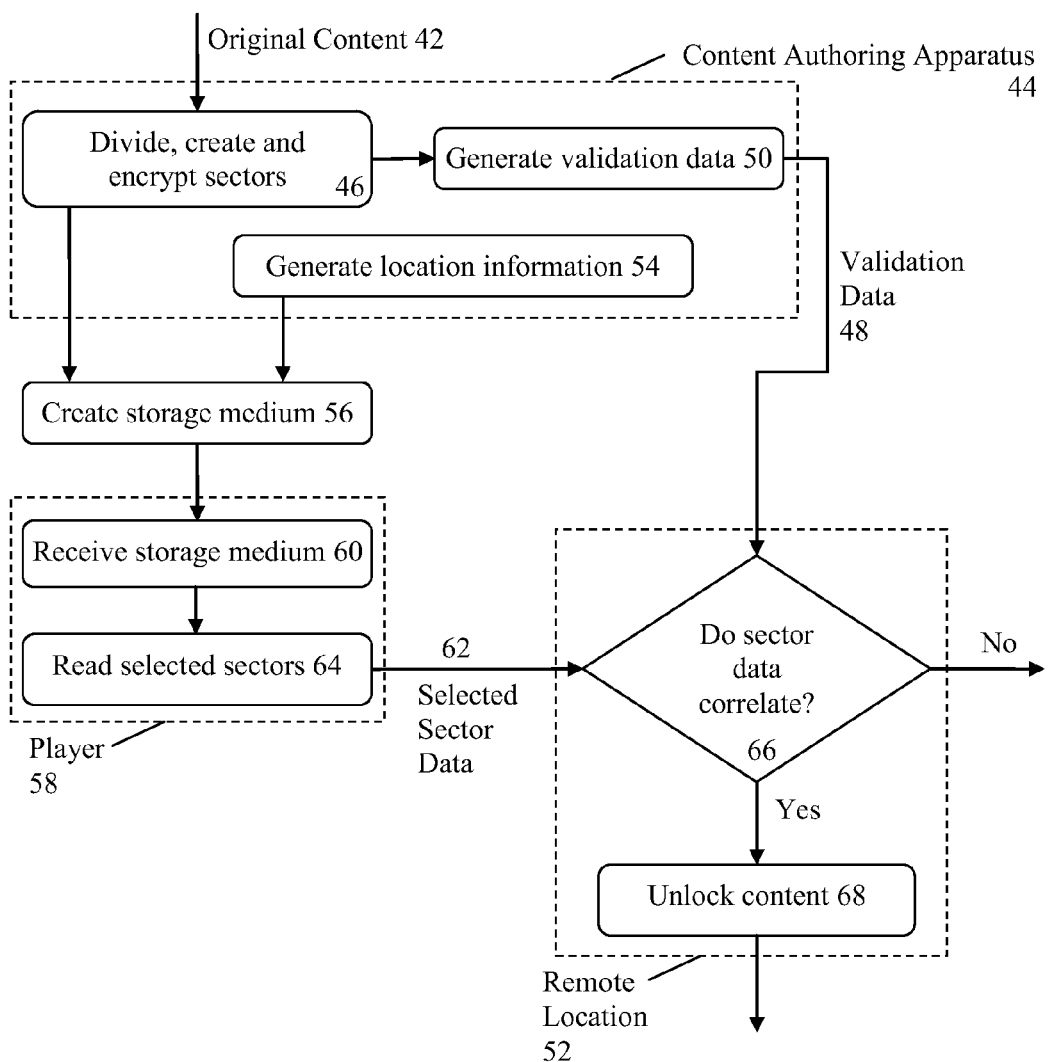
FIG. 1B graphically illustrates an example of a content protection method according to an exemplary embodiment of the present disclosure.

An example of a content unlocking method is graphically depicted in FIG. 1B. Original content 42 is input into an authoring apparatus 44. The original content 42 is divided 46 into content data portions and original data sectors are created. In the creation of the original data sectors, content data may be encrypted and/or compressed, as discussed supra. Additional data may also be added to the original data sectors, also described supra. Validation data 48 is selected 50 from among original data sectors and is then output from the authoring apparatus 44 to a local storage of a remote location 52. In the example shown in FIG. 1B, the remote location 52 is a server. The authoring apparatus also generates 54 information identifying a location of the remote location 52 and outputs this information along with the data sectors to a medium manufacturing system. Information in addition to the data sectors and remote location information may also be output to the media manufacturing system, such as information identifying a content title, an encryption method used, encryption keys, etc. The media manufacturing system creates 56 a storage medium using the input data.

When a storage medium is introduced to a player 58 and received 60 by a media input part, data from selected sectors 62 corresponding to the validation data from the selected original sectors output by the authoring apparatus to the server is read 64 by a reading part of the player from the storage medium. The selected sector data 62, along with information identifying a title or disc molding master, etc. associated with the selected sector data 62, is then output by a network communication part of the player and transmitted through an information network to the server 52. The selected sector data 62 sent to the remote location 52 may include any combination of content data and additional data included in each data sector.

In an exemplary exchange between a media player 58 and a remote location 52, the media player 58 may send information about the content title desired to be played using the player to the remote location 52. The media player 58 may also send other information to the remote location 52 such as the medium serial number or other information retrieved from the medium or information about or from the media player 58 such as a serial number of the media player 58, manufacturer information, player firmware version, player authentication information, media authentication information, etc.

A control part of the server 52 compares 66 the sector data 62 received from the player 58 to the validation data 48 received from the corresponding authoring apparatus 44. If the server 52 determines that the sector data correlate to each other, the additional content is unlocked 68.

A determination of correlation need not require that all data correlate between groups of data. Rather, correlation may be determined based on if a predetermined percentage of the data of one data group correlate to the corresponding data of the second data group. Correspondingly, a positive validation determination need not require that all data sent by the player 58 correlate to all of the corresponding validation data.

Upon a positive validation determination, the remote location 52 may be configured to perform an unlocking operation 68. For example, the unlocking operation 68 may be to allow a player to download additional content from the remote location, to permit the player to play the content stored on the storage medium, to send a key to the player necessary for decryption of the content data, to send a message to a user, through email or other methods, indicating a password associated with the storage medium or associated content, etc.

Such a validation determination, one based on a comparison of the data, which may include the ones and zeros representing the content data, may be performed to detect if a storage medium is an original storage medium or if the storage medium stores content data that is reproduction content data. For example, as discussed supra, original content data stored on an original storage medium may be encrypted in some way before it is stored on the storage medium. In this case, if a user were to attempt to reproduce the content data on a second storage media, in a media copying or duplication process, for example, the encrypted content data would need to be decrypted before it can be written in a useful form to a second storage media. This may be because, for example, decryption information may be stored at an additional data area on the original disc that is not able to be copied over to a second disc by a disc writing apparatus. Instead, the content data must be read, decrypted, and stored as unencrypted reproduction data on the reproduction storage medium. The reproduction content data, then, is not encrypted as the original content data was. As a result, in a data comparison operation performed as a part of the validation determination, the data of the reproduction data would not correlate to the associated original validation data.

The selection of which sectors are read 64 by a player 58 from a storage medium and transmitted to the remote location 52 may be predetermined or may vary. For example, validation data 48 corresponding to a large number of sectors may be sent to a remote location 52 by the content authoring apparatus 44. The medium, however, may only contain instructions for a player 58 to read a smaller number, or subset, of the sectors sent to the remote location 52 for validation. The instructions may cause a player 58 to select sectors to read 64 and send to the remote location 52 randomly from a list of the sectors whose original content data is stored at the remote location 52. By selecting sectors randomly for reading, protection circumvention efforts by users may be hampered.

Figure 2B:
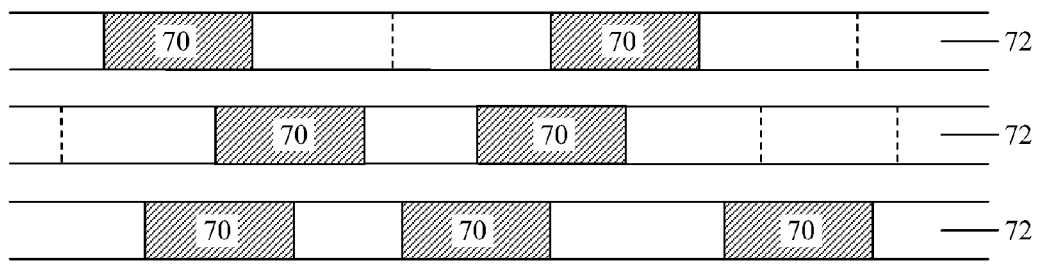
FIG. 2B graphically illustrates an example of selected data sectors according to an exemplary embodiment of the present disclosure.
Figure 2C:
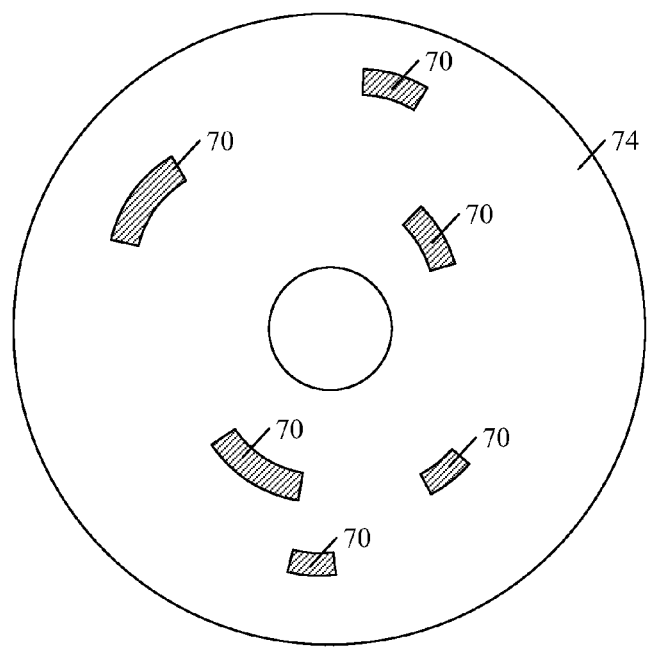
FIG. 2C graphically illustrates another example of selected data sectors according to another exemplary embodiment of the present disclosure.

FIGS. 2B and 2C notionally illustrate selected data sectors 70 identified for sending to a remote location for validation. FIG. 2B shows selected data sectors 70 located in parallel data tracks 72 or parallel loops 72 of a spiral data track. FIG. 2C shows selected sectors 70 located in various locations of a main data area of an optical storage medium 74.

Figure 3:
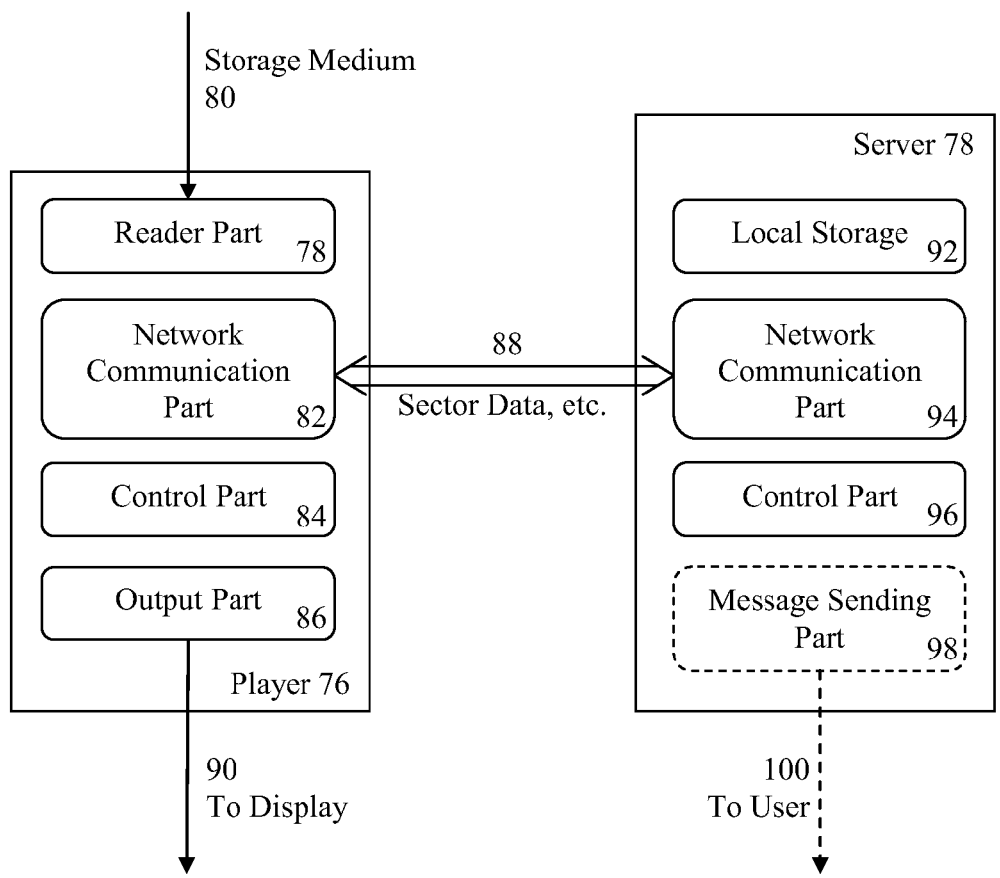
FIG. 3 notionally illustrates an example of a player and a server according to another exemplary embodiment of the present disclosure.

A media player 76, according to an exemplary embodiment of the present disclosure, is illustrated notionally in FIG. 3. A reader part 78 of the player is configured to read a storage medium 80 and communicate with a network communication part 82, a control part 84, and an output part 86. The network communication part 82 is configured to facilitate the transmission of information over an information network 88 with a remote location such as a server 78. The control part 84 is configured to direct the interaction and information flow between the various parts of the player 76. The output part 86 is configured to output content data 90 to a display.

As will be understood by one skilled in the art, the player need not be a dedicated electronic device having only a function of reproducing content stored on storage media. For example, the player may be embodied in a software program operating on a computer or other multi-functional electronic device.

A server 78, as an example of a remote location, according an exemplary embodiment of the present disclosure, is notionally illustrated in FIG. 3. A server 78 includes a local storage part 92 for storing information which includes original sector data. The server 78 also includes a network communication part 94 for facilitating the transmission of information through an information network 88 between the remote location 78 and a player 76. A control part 96 of the server 78 is configured to control the interaction of and information flow between the various parts of the remote location 78. The control part 96 is also configured to perform a comparison of original sector data and sector data received from a player 90.

A server 78 may also include a message sending part 98 configured to send information 100 to a user via means independent from the player 76. For example, the message sending part 98 may be configured to send a user an email or SMS text message. Such message may indicate an error, a validation failure, or may include an authorization code for entering into a player, website, etc. required to access additional content.

Figure 4:
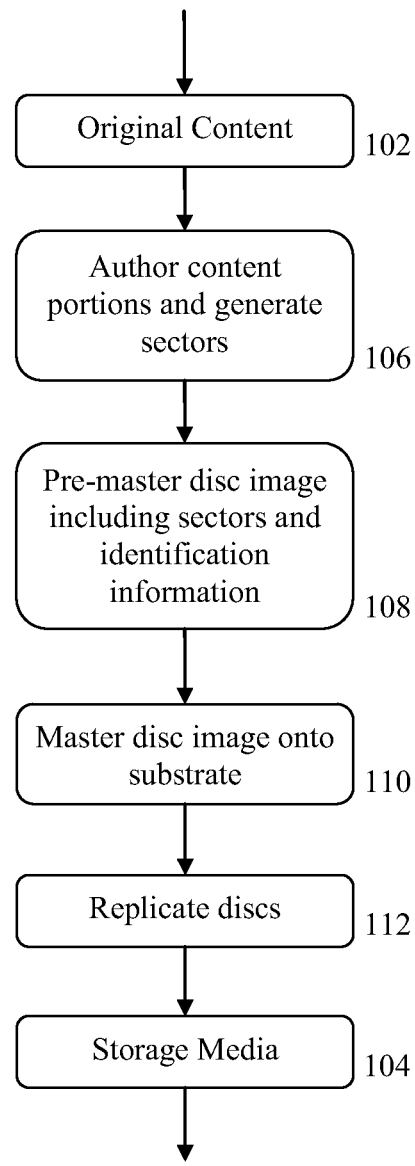
FIG. 4 graphically illustrates an example of an optical storage media manufacturing process according to another exemplary embodiment of the present disclosure.

FIG. 4 generally illustrates an optical disc manufacturing process. The general steps in an optical storage disc manufacturing process for storing original content 102 on optical storage discs (storage media) 104 are authoring 106, pre-mastering 108, mastering 110 and replication 112.

Authoring 106 includes gathering from content sources (and creating) source materials including, in the exemplary case of original content in the form of videos or audio files, video assets, audio assets, playlists, menu content, still pictures, video stills, sub-pictures, and subtitle text, formulating information for a video title set, video management, presentation control and data search, and determining and embedding functionality into the menus, sub-pictures, program chain information files, and video objects. All of these elements, or content portions, are assembled (into a content hierarchy or roadmap), synchronized, and encoded, and then an application (that is, a self-contained and self-organized package of content which, when embodied in an optical disc inserted in a player, commences playing at the start of the package and then stops at the end, assuming no intervening user control) is created. An authoring tool can be used to guide a user through the authoring process, including inserting data in specified locations (relative to content to be reproduced by a player).

Figure 5:
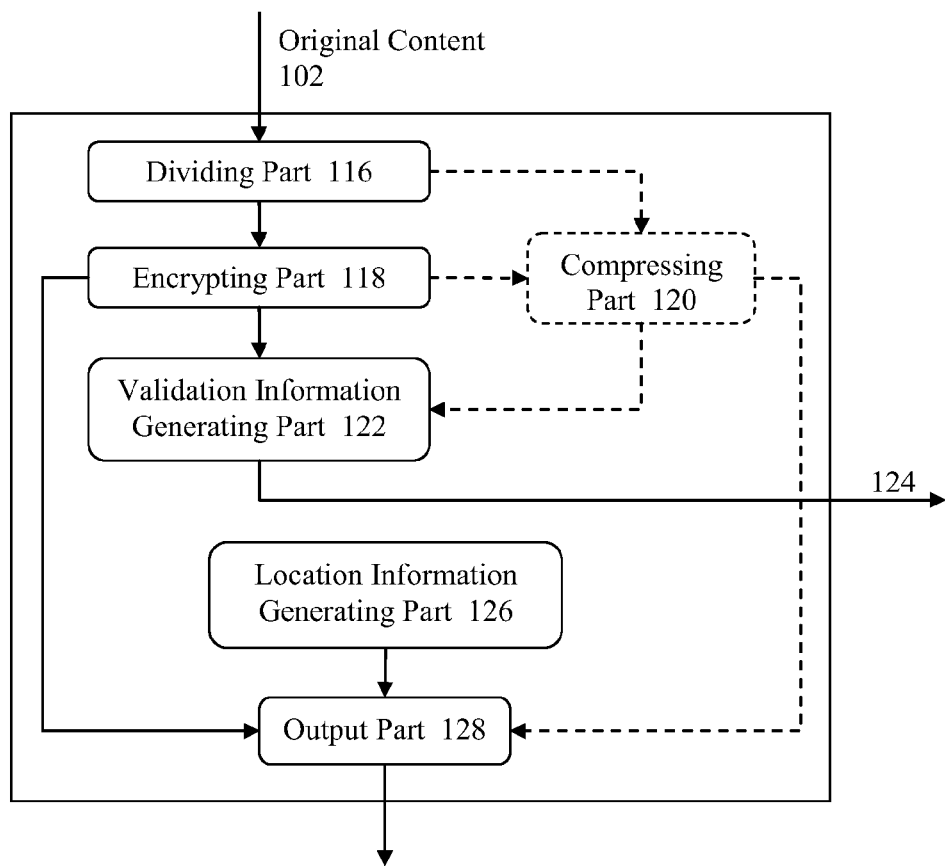
FIG. 5 notionally illustrates a content authoring apparatus according to an exemplary embodiment of the present disclosure.

FIG. 5 is a notional illustration of a content authoring apparatus 114 according to the present disclosure. Original content 102 is input and divided by a dividing part 116 into a plurality of data portions. The portions are encrypted by an encryption part 118. Either unencrypted or encrypted data portions may be compressed by a compression part 120. A validation information generation part 122 then outputs validation data 124 from selected data portions for storing at a content unlocking apparatus. Information identifying the location of the content unlocking apparatus is generated by the location generating part 126. The encrypted and/or compressed data portions and location identification information are output by an output part 128 to be recorded in or on a storage medium.

An application comprises one or more title sets that contain the video and audio information as data streams. A title set can contain a number of menus and titles which are intended to act together. The menus collectively enable a viewer to navigate the content, and thus deliver an interactive experience to the viewer. Thus, the data stored on the disc includes presentation data (for example, video, still image, audio content, playlists, subtitles, captions, etc.) and navigation data (for example, information and commands that provide basic interactivity).

Each title set can be subdivided into chapters. Chapters in turn can be broken down into segments and/or scenes. Chapters, segments and scenes comprise plural cells which are the basic unit in the application. A playlist indicating an intended playing order for the various content portions for reproducing the original content title is generated. All content data is then divided into data frames and associated data sectors are created. The data sectors, as described supra, may further include additional data associated with the content data frames.

After an application is completed in the authoring step 106, the pre-mastering step 108 may be initiated using a pre-mastering tool to generate a disc image, and then store the disc image on appropriate media for replication or testing. The disc image includes the various content portions, modified playlist, and other data. Disc image files may also be tested through player emulator software, in order to confirm that the data is in a format that can be read and decoded by players. After pre-mastering 108, a replicator can take the disc image source media and manufacture disc replicas of that image in a mastering step 110 and a replication step 112.

Authoring software is often used to guide a user through the authoring 106 and pre-mastering 108 processes, such that the output is compliant with all application standards (such as the various CD, DVD or BD specifications). Therefore, the term "authoring" often is used to denote a larger process which includes the authoring 106 and pre-mastering 108 sub-processes described supra, for putting together content to be recorded on an optical recording medium. Authoring software is available commercially, as well as in the form of freeware or other open-source packages.

Mastering 110 is a process, following pre-mastering 108 in the optical disc manufacturing process, for creating a model, on a glass substrate, of the final disc (which is used for generating a stamper, used as a mold for manufacturing the optical media). Mastering 110 includes reading a disc image (information including the content portions and modified playlist) from a source media, and then formatting, encoding, and processing the information into a modulated data signal. The modulated data signal is used to control the formation of the physical structures on the substrate.

Mastering 110 is generally followed in the manufacturing process by a replication step 112 which includes molding, metalizing, printing, and testing sub-processes.

Figure 6:
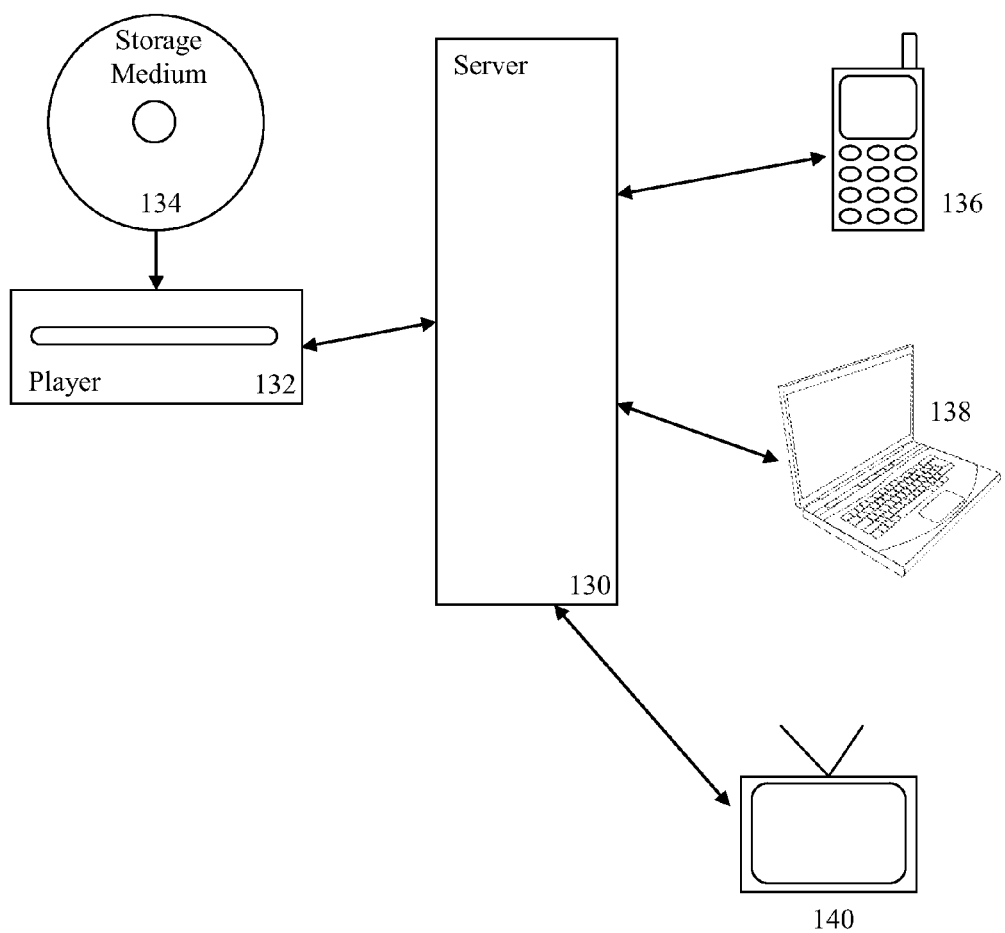
FIG. 6 notionally illustrates an example of many players and a server according to another exemplary embodiment of the present disclosure.

In another aspect of the present disclosure, illustrated notionally in FIG. 6, a remote location may be configured to communicate with a plurality of types of media players. For example, a server 130, as an example of a remote location, may be configured to communicate through a first network communication part via a first information network with an optical media player 132 reading an optical storage medium 134. The validation of a storage media is carried out as described supra. Upon successful validation, additional content is unlocked by the server 130. The server 130 may be configured with a second network communication part configured to communicate through a second information network with a plurality of types of other devices. Examples of such other devices include, but are not limited to, mobile telephones 136, computers 138, televisions 140, e-book readers (not shown), etc. In one example, the additional content unlocked by the server 130 may be accessible by media players such as the types listed supra through the second information network.

Using various methodologies described herein, an optimum balance between requirements of a user and requirements of a content owner may be accomplished in consideration of the amount of data necessary to be downloaded from a remote location.

In addition, the aforementioned embodiments and examples are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

What is claimed is:

1. A method performed by a content unlocking apparatus configured to selectively unlock digital content, said method comprising:
   (a) extracting medium identification information from a request for unlocking digital content on a storage medium, the request having been received through an information network from a content reproduction apparatus for reproducing the content from the storage medium;
   (b) identifying at least one validation data sector of the storage medium based on the medium identification information extracted in step (a);
   (c) requesting, through the information network, data to be read by the content reproduction apparatus from the at least one validation data sector identified in step (b) by the content unlocking apparatus based on the medium identification information extracted in step (a) by the content unlocking apparatus;
   (d) comparing data received as a result of the requesting step to original validation data corresponding to the data requested from the at least one validation data sector;
   (e) when the data received as a result of the requesting step correlates to at least a predetermined amount of the original validation data, unlocking the digital content on the storage medium and allowing the content reproduction apparatus to reproduce the unlocked digital content and unlocking, and allowing the content reproduction apparatus to reproduce additional content different from the digital content.

2. The method of claim 1, wherein the predetermined amount is less than all of the original validation data.

3. The method of claim 1, wherein the at least one validation data sector is identified by selecting at least one validation data sector at random from a group of at least two potential validation data sectors.

4. The method of claim 1, further comprising:
   transmitting, over the information network, digital content unlocked as a result of the unlocking step to the content reproduction apparatus.

5. The method of claim 1, further comprising:
   transmitting digital content unlocked as a result of the unlocking step to an additional content reproduction apparatus different from the content reproduction apparatus from which the content unlocking request was received.

6. The method of claim 1, wherein the original validation data is data from the at least one validation data sector of an original medium image.

7. The method of claim 6, wherein the original validation data is at least one of encrypted and compressed.

8. A content unlocking apparatus configured to selectively unlock digital content, said content unlocking apparatus comprising:
   a local storage part configured to store original validation data associated with at least one validation data sector of a storage medium;
   a network communication part configured to communicate through an information network with a content reproduction apparatus; and
   a control part configured to extract medium identification information from a request for unlocking digital content on a storage medium, the request having been received through the information network from the content reproduction apparatus for reproducing content from a storage medium, identify the at least one validation data sector of the storage medium based on the extracted medium identification information, request, through the information network, data to be read by the content reproduction apparatus from the at least one validation data sector identified based on the extracted medium identification information, and unlock the digital content on the storage medium
   if medium validation data received through the network communication part from the content reproduction apparatus corresponding to the at least one validation data sector read from the storage medium correlates to a predetermined amount of the original validation data, unlock the digital content on the storage medium and allow the content reproduction apparatus to reproduce the unlocked digital content and unlock, and allow the content reproduction apparatus to reproduce additional content different from the digital content.

9. The content unlocking apparatus of claim 8, wherein the predetermined amount of the original validation data is less than all of the original validation data.

10. The content unlocking apparatus of claim 8, wherein the control part is configured to request from the content reproduction apparatus, through the network communication part, medium validation data from one or more selected validation data sectors selected from among the at least one validation data sectors.

11. The content unlocking apparatus of claim 10, wherein the number of the at least one selected validation data sectors is less than a number of the at least one validation data sectors.

12. The content unlocking apparatus of claim 10, wherein the one or more selected validation data sectors are selected randomly from among the at least one validation data sectors.

13. The content unlocking apparatus of claim 8, further comprising:
   a message sending part,
   wherein if the medium validation data received from the content reproduction apparatus does not correlate to the predetermined amount of the original validation data, the control part is configured to instruct the message sending part to send a message to a user indicating a validation failure.

14. The apparatus of claim 8, further comprising:
   a message sending part,
   wherein if the medium validation data received from the content reproduction apparatus does correlate to at least the predetermined amount of the data associated with the at least one validation data sector, the control part is configured to instruct the message sending part to send a message to a user indicating information for retrieving the unlocked content.

15. The content unlocking apparatus of claim 8, wherein
   the local storage part also stores the content which may be unlocked by the control part and
   the control part is configured to control the network communication part to send, if unlocked by the control part, the unlocked content to the content reproduction apparatus.

16. The content unlocking apparatus of claim 8, further comprising:
   a second network communication part configured to communicate through an information network with a second content reproduction apparatus other than the content reproduction apparatus, wherein the local storage part also stores the content which may be unlocked by the control part and the control part is configured to control the second network communication part to allow, if unlocked by the control part, the unlocked content to be retrieved by the second content reproduction apparatus.

17. The content unlocking apparatus of claim 16, wherein the second content reproduction apparatus is one of a cell phone, a computer, an e-reader, and an optical media player.

18. A method performed by an apparatus configured to selectively unlock digital content, said method comprising:
(a) extracting medium identification information from a request for content unlocking received through an information network from a content reproduction apparatus for reproducing content from a storage medium;
(b) identifying at least one validation data sector of the storage medium based on the medium identification information extracted in step (a);
(c) requesting, through the information network, data to be read by the content reproduction apparatus from the at least one validation data sector identified in step (b);
(d) comparing data received as a result of the requesting step to original validation data corresponding to the data requested from the at least one validation data sector;
(e) when the data received as a result of the requesting step correlates to at least a predetermined amount of the original validation data, unlocking the digital content on the storage medium and allowing the content reproduction apparatus to reproduce the unlocked digital content and unlocking, and allowing the content reproduction apparatus to reproduce additional content different from the digital content, wherein the digital content is divided into content data portions to create original data sectors and the at least one original validation data sector is selected from among the original data sectors.

* * * * *